(12) United States Patent
Morgans et al.

(10) Patent No.: US 9,085,327 B2
(45) Date of Patent: Jul. 21, 2015

(54) VEHICLE ROOF REINFORCEMENT

(75) Inventors: Shawn Michael Morgans, Chelsea, MI (US); John Patrick Joyce, Livonia, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 1462 days.

(21) Appl. No.: 12/481,738

(22) Filed: Jun. 10, 2009

(65) Prior Publication Data

US 2010/0314911 A1   Dec. 16, 2010

(51) Int. Cl.
*B62D 25/06* (2006.01)

(52) U.S. Cl.
CPC ........... *B62D 25/06* (2013.01); *Y10T 29/49947* (2015.01)

(58) Field of Classification Search
CPC ........................................................ B62D 25/06
USPC ..................................... 296/203.03, 210, 213
See application file for complete search history.

(56) References Cited

U.S. PATENT DOCUMENTS

| | | | |
|---|---|---|---|
| 1,522,200 A * | 1/1925 | Masury | 296/210 |
| 2,481,868 A * | 9/1949 | Philip | 296/210 |
| 3,195,439 A * | 7/1965 | Stratton | 454/136 |
| 3,367,711 A * | 2/1968 | Barenyi | 296/210 |
| 3,728,537 A * | 4/1973 | Barenyi et al. | 362/493 |
| 3,833,254 A * | 9/1974 | Renner | 296/210 |
| 3,926,100 A * | 12/1975 | Bermanseder et al. | 454/108 |
| 4,601,511 A * | 7/1986 | Nakamura et al. | 296/210 |
| 5,642,563 A * | 7/1997 | Bonnett | 29/771 |
| 6,027,160 A | 2/2000 | Brodt | |
| 6,250,528 B1 | 6/2001 | Lumpe | |
| 6,299,241 B1 * | 10/2001 | Heya et al. | 296/203.03 |
| 6,347,829 B1 | 2/2002 | Hanyu | |
| 6,373,021 B1 * | 4/2002 | Wang et al. | 219/93 |
| 7,004,536 B2 * | 2/2006 | Wieber | 296/210 |
| 7,121,615 B2 * | 10/2006 | Hoshino | 296/203.03 |
| 7,140,671 B2 * | 11/2006 | Frazier et al. | 296/190.08 |
| 7,159,931 B2 * | 1/2007 | Chernoff et al. | 296/187.01 |

(Continued)

FOREIGN PATENT DOCUMENTS

| | | |
|---|---|---|
| CN | 1625502 A | 6/2005 |
| CN | 1923590 A | 3/2007 |

(Continued)

OTHER PUBLICATIONS

First Office Action issued in corresponding Chinese Application No. 201010194858.8, having a mailing date of Dec. 4, 2013.

(Continued)

*Primary Examiner* — Glenn Dayoan
*Assistant Examiner* — Paul Chevenert
(74) *Attorney, Agent, or Firm* — Jones Robb, PLLC; Jason Rogers

(57) ABSTRACT

A vehicle body structure comprises body side panels each comprising a roof mounting surface, a roof panel having opposing sides, and a brazed joint attaching the roof panel to the body side panels along a line of contact. The roof panel comprises a raised bead portion on each side of a central portion, character lines having sloped surfaces extending downward from each raised bead portion to the central portion, and a side mounting flange at each side of the roof panel that curls under the raised bead portions. Each side mounting flange has a line of contact with a corresponding roof mounting surface.

20 Claims, 2 Drawing Sheets

(56) References Cited

U.S. PATENT DOCUMENTS

| | | |
|---|---|---|
| 7,182,381 B2 | 2/2007 | Ogawa |
| 7,267,395 B2 * | 9/2007 | Tomozawa ............... 296/203.03 |
| 7,290,831 B2 * | 11/2007 | Poss et al. ................ 296/203.03 |
| 7,377,581 B2 | 5/2008 | Barutzky |
| 2003/0122405 A1 | 7/2003 | Stallfort |
| 2003/0141747 A1 * | 7/2003 | Honma et al. ............ 296/203.03 |
| 2005/0104418 A1 * | 5/2005 | Zirbs ............................ 296/210 |
| 2005/0116509 A1 * | 6/2005 | Ido et al. ..................... 296/210 |
| 2005/0140158 A1 * | 6/2005 | Ogawa et al. ................. 296/29 |
| 2005/0146163 A1 | 7/2005 | Martinez et al. |
| 2006/0290173 A1 * | 12/2006 | Wolkersdorfer et al. ..... 296/210 |
| 2011/0121614 A1 * | 5/2011 | Kobayashi et al. ........... 296/210 |

FOREIGN PATENT DOCUMENTS

| | | | | |
|---|---|---|---|---|
| DE | 3128038 A1 * | 2/1983 | | B62D 31/00 |
| EP | 1759960 A2 | 7/2007 | | |
| FR | 1175642 A | 3/1959 | | |
| GB | 816088 A | 7/1959 | | |
| JP | 59-011975 A | 1/1984 | | |
| JP | 61016174 A * | 1/1986 | | B62D 25/07 |
| JP | 61077521 A * | 4/1986 | | B60J 5/04 |
| JP | 61271175 A * | 12/1986 | | B62D 25/06 |
| JP | 62105778 A * | 5/1987 | | B62D 25/06 |
| JP | 03239680 A * | 10/1991 | | B62D 25/06 |
| JP | 05085405 A * | 4/1993 | | B62D 25/07 |

OTHER PUBLICATIONS

Second Office Action issued in corresponding Chinese Application No. 201010194858.8, having a mailing date of Aug. 5, 2014.
First Office Action issue issued in corresponding Mexican Application No. MX/a/2010/006343, having a mailing date of Mar. 22, 2013.
Second Office Action issue issued in corresponding Mexican Application No. MX/a/2010/006343, having a mailing date of Aug. 23, 2013.

* cited by examiner

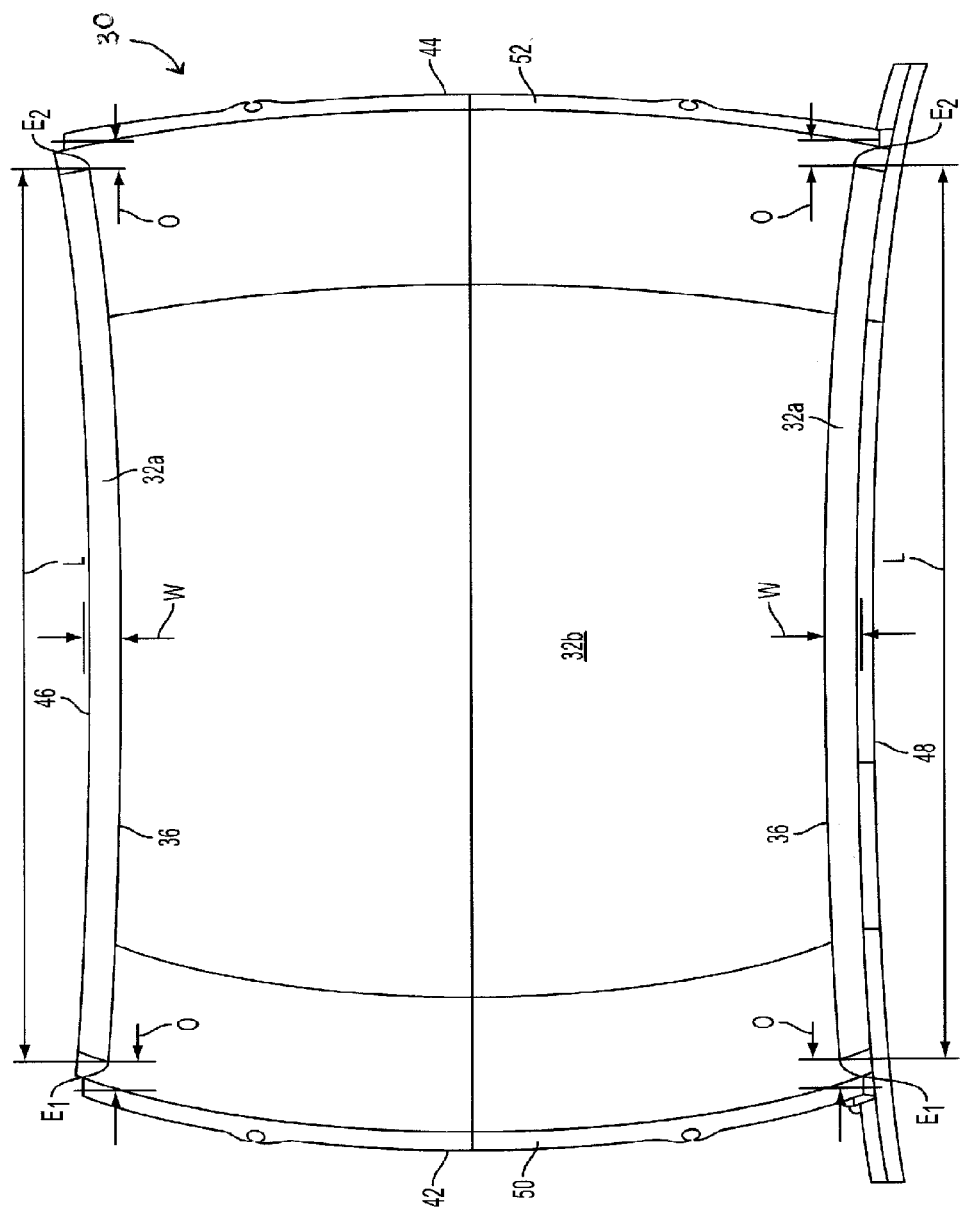

US 9,085,327 B2

VEHICLE ROOF REINFORCEMENT

INTRODUCTION

1. Field

The present teachings relate to a reinforcement feature in a vehicle roof to prevent damage to a thin steel roof by absorbing vertical forces, such as mounting forces, applied to the roof. The present teachings also relate to a character line in a roof panel configured to prevent damage from tooling used in a brazing operation.

2. Background

Typical construction of an automotive vehicle involves joining various individual stamped sheet metal parts into multi-piece subassemblies such as, for example, body side panels. A known method for joining the subassemblies, referred to as a layered build roof construction method, allows the roof panel to be joined to the other subassemblies after the other subassemblies have been joined and have left a framing station. The roof panel must therefore be mounted and affixed to, for example, of outer body side panels after the subassemblies have been joined in a fixed relationship.

One desirable method for attaching a roof panel to body side panels is known as brazing. Brazing can comprise, for example, a joining process whereby a filler material or alloy is heated to melting temperature above about 420° C.-450° C. and distributed between two or more close-fitting parts by capillary action. At its liquid temperature, the molten filler or alloy and flux can interact with a thin layer of the base metal, and cool to form a strong, sealed joint. The melting temperature of the braze filler or alloy can be lower than the melting temperature of the materials being joined. Brazing typically requires that a zero gap condition (substantially no gap) exists between the surfaces being joined.

To achieve such a zero gap condition between a roof panel and body side panels, one or more pusher blocks can be used to apply a mounting force to press a roof panel to a roof mounting surface of the body side panels. Such a mounting force can be applied at each side of the roof panel. Because the mounting force must be applied to the roof panel, the roof panel must have sufficient strength to withstand such a force without permanent deformation. Presently, roof panels subject to such a mounting force must have a thickness that provides sufficient strength to withstand the mounting force without permanent deformation.

SUMMARY

The present teachings provide a method for attaching a vehicle roof panel to opposing vehicle body side panels. The method comprises: placing the vehicle roof on the opposing body side panels, the vehicle roof comprising a character line; applying a mounting force to the roof panel to create a line of contact between the roof panel and each of the body side panels, the character line absorbing vertical deformation of the vehicle roof in response to the mounting force; and attaching the roof panel to the body side panels via one of brazing, welding, adhesives, and fasteners.

The present teachings also provide a method of manufacturing a steel vehicle roof panel having a thickness of less than 0.63 mm and which is able to withstand mounting forces applied orthogonal to a plane in which the roof panel generally lies. The method comprises stamping a vehicle roof panel such that a raised bead portion is formed at each side thereof. Stamping of the roof panel to create the raised bead portions creates a character line that strengthens the roof by absorbing absorption of at least a portion of the mounting forces.

The present teachings also provide a vehicle roof panel for attachment to a body side panel by application of a mounting force and brazing. The roof panel comprises a stamped steel sheet having a thickness of less than 0.63 mm, a raised bead portion at the outer edges thereof, a central portion, and a character line extending from the central portion to the raised bead portion.

The present teachings further provide a vehicle body structure comprises body side panels each comprising a roof mounting surface, a roof panel having opposing sides, and a brazed joint attaching the roof panel to the body side panels along a line of contact. The roof panel comprises a raised bead portion on each side of a central portion, character lines having sloped surfaces extending downward from each raised bead portion to the central portion, and a side mounting flange at each side of the roof panel that curls under the raised bead portions. Each side mounting flange has a line of contact with a corresponding roof mounting surface.

Additional objects and advantages of the present teachings will be set forth in part in the description which follows, and in part will be obvious from the description, or may be learned by practice of the teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and, together with the description, serve to explain the principles of the teachings.

BRIEF DESCRIPTION OF THE DRAWINGS

FIG. 2 is top view of a roof panel including reinforcements in accordance with certain embodiments of the present teachings.

DESCRIPTION OF THE EMBODIMENTS

Figure 1:
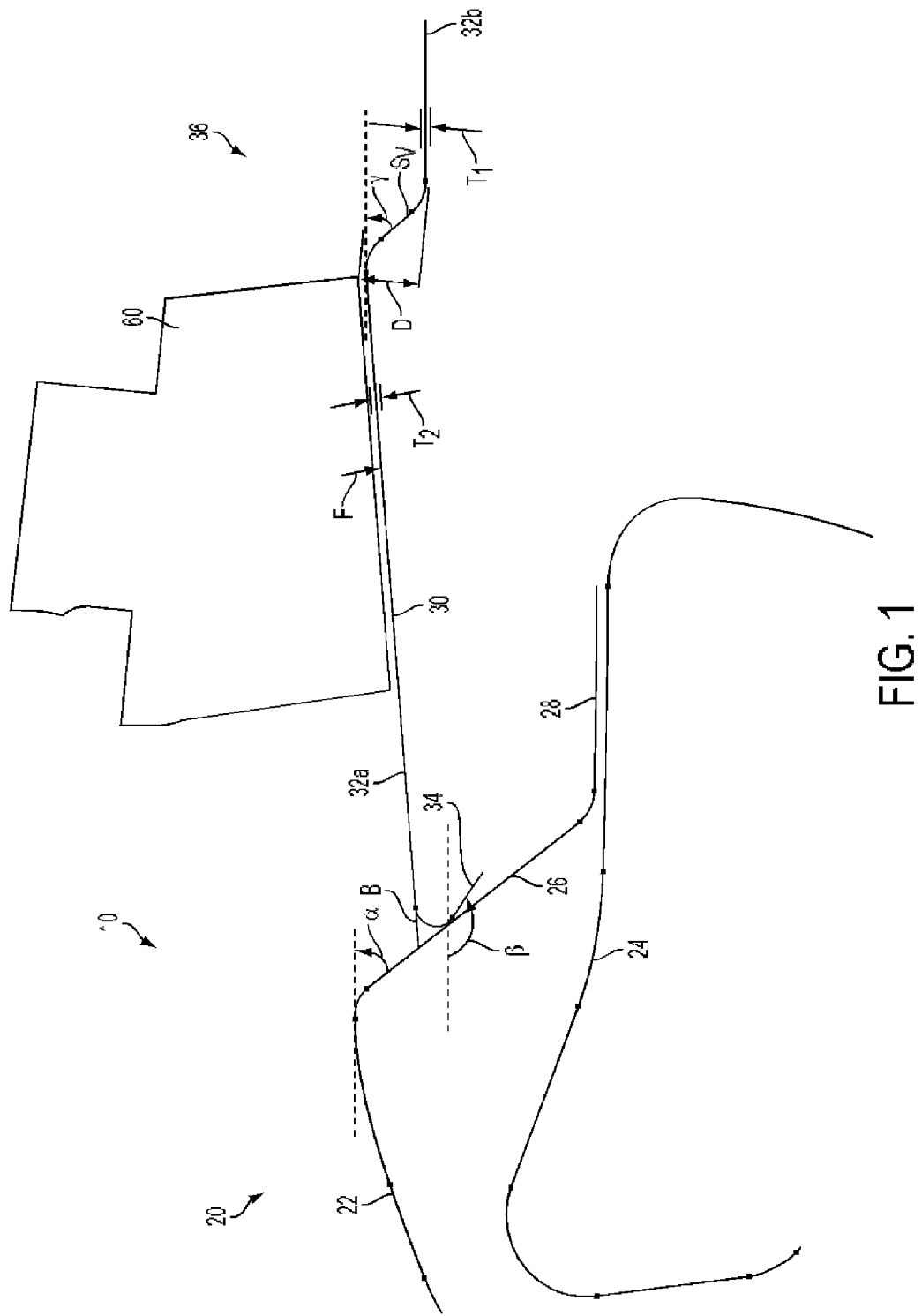
FIG. 1 is a cross sectional view of a roof panel including a reinforcement feature in accordance with certain embodiments of the present teachings, placed on a body side panel for joining.

Reference will now be made in detail to exemplary embodiments of the present teachings, examples of which are illustrated in the accompanying drawings.

FIG. 1 illustrates a cross section of a vehicle body structure, indicated generally at 10, including a body side panel 20 and a roof panel 30. In the illustrated exemplary embodiment, the roof panel 30 rests on the body side panel 20, for example just prior to attaching (e.g., via brazing) the roof panel 30 to the body side panel 20. While only one side of the roof panel 30 and body side panel 20 interaction is shown in FIG. 1, the opposing body side panel (not shown) and roof panel portion are symmetric with the illustration.

In certain embodiments of the present teachings, the body side panel 20 can comprise individual stamped sheet metal parts that are welded together to form an A-pillar, a B-pillar, a C-pillar, and an upper portion (of which FIG. 1 is an exemplary cross section) defining a door closure, as well as other vehicle features. Individual parts of the body side panel 20 can include, for example, an outer side portion 22, a body side reinforcement structure 24, a roof mounting surface 26 extending inwardly and downwardly from the outer side portion 22, and a generally horizontal portion 28 extending inwardly from the roof mounting surface 26. One skilled in the art will understand that an upper front roof header panel (not shown) can attach to the body side panel 20 and extend laterally across the vehicle body structure 10 to attach to an opposing body side panel (also not shown). For a layered build roof construction, the body side panels and roof header panel can be attached together (e.g., by welding, adhesive, fasteners, brazing, or another suitable method) in a framing station (not shown) to form one or more subassemblies prior to mounting and attaching the roof panel 30 to the one or more subassemblies, which can occur after the subassemblies leave the framing station.

The generally horizontal portion 28 and body side reinforcement structure 24 can be attached, for example, via welding. Above the generally horizontal portion, the roof mounting surface 26 can extend along a length of the vehicle (e.g., along the upper portion of the body side panel from a front to a rear thereof) for mating with the roof panel 30 and can comprise a single surface oriented at an angle of, for example, from about 30° to about 60° with respect to the horizontal. More specifically, as shown in the illustrated exemplary embodiment, the roof mounting surface can extend at an angle α of about 45° with respect to the horizontal. The angle of the roof mounting surface 26 can allow the roof panel position to vary vertically depending on the tolerances in the roof panel 30 and tolerances in spacing between body side panels 20, while still allowing a tight fit between the roof panel 30 and body side panels 20. As stated above, a tight fit (e.g., a zero tolerance condition) is desirable when utilizing attachment processes such as laser brazing to obtain a smooth, finished appearance.

As discussed above, in a layered build roof construction, the roof panel 30 can mount on opposing body side panels 20, for example after the body side panels 20 have left a framing station (not shown) that secures together the left body side panel 20, the corresponding right body side panel (not shown) and an underbody (not shown). By the time the vehicle body structure 10, then, is finished in the framing station, the spacing is fixed between the roof mounting surface 26 on the left side and the corresponding roof mounting surface (not shown) on the right side. Moreover, the roof panel 30 is typically mounted and secured to the body side panels 20 after they have been secured with other subassemblies of the vehicle body structure so that the distance between opposing roof mounting surfaces is fixed.

In various embodiments of the present teachings, the roof panel 30 includes a main section made up of outer and central portions 32a and 32b, and side mounting flanges 34 (only one side is shown) that can extend laterally under an outer portion 32a of the main section of the roof panel. In certain embodiments, the side mounting flanges 34 of the roof panel 30 extend from the outer portion 32a of the roof main section at an angle greater than 90° downward relative to the horizontal. However, one skilled in the art will appreciate that the side mounting flanges need not extend at an angle greater than 90°. Indeed, the roof panel need not even comprise side mounting flanges 34. However, in certain embodiments of the present teachings, the side mounting flanges 34 are angled enough to cause line contact between each side mounting flange 34 and a corresponding roof mounting surface 26, thus facilitating mounting of the roof panel 30 to the body side panel 20. In the illustrated exemplary embodiment of FIG. 1, the roof mounting surface 26 extends at an angle α of 45° with respect to the horizontal and the corresponding side mounting flange 34 extends at an angle β greater than 135° with respect to the horizontal. Line contact between the side mounting flange 34 and the roof mounting surface 26 can accommodate tolerances in (1) the angles of the side mounting flange and roof mounting surface, and (2) the spacing between body side panels, while still assuring a tight fit (e.g., zero tolerance condition for brazing) between the side mounting flange 34 and its corresponding roof mounting surface 26.

To ensure a zero tolerance condition sufficient for such attachment methods as brazing, a mounting force F that can be, for example, about three pounds to about forty pounds, can be applied to the roof panel 30 to press the roof panel 30 onto the roof mounting surface 26. In certain embodiments, the mounting force F is applied by one more pusher blocks 60. The pusher block(s) 60 can, for example, press an outer portion 32a of the roof panel main section on each side of the roof panel, generally adjacent to the edges of the roof panel where, in the illustrated embodiment, the roof side mounting flange 34 contacts the roof mounting surface 26. The mounting force applied by each pusher block 60 should be minimized, but should be sufficient to attain a suitable fit (e.g., zero tolerance) between the roof mounting surface 26 and the roof side mounting flange 34 for the desired mounting method (e.g., brazing). Forces applied by the pusher block(s) can be lessened if the roof mounting surface 26 and the roof side mounting flange 34 are well matched along a line of contact therebetween. In various embodiments of the present teachings, for example for a typical mid-sized sedan, five to seven pusher blocks can be used on each side of the vehicle, each applying a mounting force F of from three to forty pounds. In certain embodiments of the present teachings, the mounting force F need not be fixed, and can be applied on a vehicle-by-vehicle basis or model-by-model basis, for example, to a level so that the fit between the roof mounting surface 26 and the roof side mounting flange 34 is sufficient for the desired mounting method (e.g., brazing).

Because a mounting force F is applied to the roof panel 30, the roof panel 30 must have a thickness T1 giving it sufficient strength to accommodate such a force with no permanent deformation or at least a suitably limited amount of permanent deformation. Typical mid-sized sedans subject to the mounting forces F of pusher block(s) 60 have a minimum steel roof thickness T1 of about 0.63 mm. In various embodiments of the present teachings, a steel roof thickness T1 can be, for example, about 0.53 mm to about 0.60 mm. Minimizing the thickness of the roof panel is desirable because it can reduce material costs and overall vehicle weight. Increasing roof strength without increasing its thickness or while decreasing thickness can be achieved by employing two or more reinforcement features in accordance with the present teachings, such as the character lines described below. As illustrated in FIG. 2, a roof panel 30 in accordance with the present teachings can comprise two or more character lines 36 in the roof panel 30 that strengthen the roof panel 30 and allow a reduced thickness T1 of the roof panel to about 0.53 mm to about 0.60 mm, or by about 0.03 mm to about 0.10 mm from a typical thickness, even when a mounting force is applied. Thus, for a typical steel roof of a mid-sized sedan, a weight savings of about 1.52 kg can be achieved.

A character line 36 in accordance with the present teachings can have a depth O of, for example, about 3.0 mm to about 5.0 mm for an average mid-sized sedan. In certain embodiments, the character line 36 can be made as deep as possible without causing stamping issues or aesthetic issues. Each character line 36 can slope downward at an angle γ of about 30° to about 85° relative to horizontal, or in certain embodiments at an angle γ of about 45° with respect to the horizontal. In various embodiments, the angle γ can be increased to step down as quickly as possible within the limits of stamping and aesthetics. One skilled in the art will appreciate that the angle of downward slope of the character line 36 could even include, for example, an angle γ of up to about 135° with respect to the horizontal, giving the character line 36 a possible backward angle. In various embodiments of the present teachings, the depth of the character line 36 tapers to zero (to the global roof surface) at front and rear ends thereof.

The sloped surface $S_V$ of the character line 36, which extends between outer portion 32a of the roof panel 30 and central portion 32b of the roof panel 30, allows the character line 36 to absorb a portion of vertical forces applied to the vehicle roof, such as a mounting force(s) F exerted by pusher block(s) 60. The character line 36 can resist deformation of the roof panel 30 by stiffening the area where the mounting force F is applied and distributing the applied mounting force F to prevent local deformation that could become permanent and interfere with creating line contact between the roof panel 30 and the body side panels 20. The mounting force F is typically applied substantially orthogonally to a plane in which the roof generally lies. By providing a reactive surface to absorb a portion of the substantially orthogonally applied mounting force F, the character line 36 strengthens the roof panel 30, thereby allowing use of a thinner steel for a roof panel subject to given forces of a pusher block. For example, as stated above, character lines running along each side of a mid-sized sedan roof panel adjacent a location of mounting force application, can allow use of a steel roof having a minimum thickness of about 0.53 mm to about 0.60 mm, thus saving weight and materials for each vehicle.

In certain embodiments of the present teachings, a thickness $T_2$ of a raised bead portion (outer portion) 32a of the roof panel main section can be greater than a thickness $T_1$ of a central portion 32b of the roof panel main section. Such a thickness differential may occur when a character line is formed by stamping, but can also occur via other means, for example constructing a 3-piece roof having thicker raised bead portions 32a. Having a thicker raised bead portion 32a abutting the pusher block 60 can be advantageous in providing additional roof strength to withstand the mounting force F applied by each pusher block 60 at a location where the mounting force F is applied. In certain embodiments, the difference in thickness between the raised bead portion 32a and the central portion 32b can be from about 0 mm to about 0.10 mm. The difference in thickness between the raised bead portion 32a and the central portion 32b can be more than 0.10 mm, for example utilizing a tailor rolled blank.

FIG. 2 illustrates a top view of an exemplary embodiment of a roof panel 30 in accordance with the present teachings. The roof panel 30 includes a front 42, a rear 44, and two sides 46 and 48. In accordance with various embodiments, the sides 46 and 48 can be substantially mirror images. The front 42 of the roof panel 30 can include a front windshield mounting flange 50. The rear 44 of the roof panel 30 can include a rear window mounting flange 52. In the illustrated exemplary embodiment, each character line 36 runs laterally along a length of the roof from a first end $E_1$ adjacent the front 42 of the roof panel 30 to a second end $E_2$ adjacent the rear 44 of the roof panel 30. In various embodiments of the present teachings, the character line 36 can run generally parallel to the line where the roof panel 30 will be joined to the body side panel 20, for example a brazing line. In certain embodiments, the character line 36 can be spaced inwardly from a brazing line about by a width W of, for example, about 40 mm. One skilled in the art will appreciate that, in accordance with the present teachings, the spacing W can be adjusted for functional and aesthetic reasons, and can differ for different vehicle models. Rather than running generally parallel to a brazing joint, the character line 36 can run generally parallel to an edge of the roof panel 30, which may be the same as the brazing joint.

In certain embodiments of the present teachings, the outer bead portions 32a can be raised up and out of a main section of the roof panel. In embodiments utilizing stamping to form a roof panel in accordance with the present teachings, the beads 32a can be stepped higher than the central portion 32b of the roof panel 30, or the central portion 32b can be stepped lower than the beads 32a of the roof panel 30.

In various embodiments, the character line 36 can be spaced from a front and rear of the roof panel 30 by a distance O, so that the character line 36 does not extend all the way to the front and rear of the roof panel 30. The distances O can be, for example for a mid-sized sedan, about 25 mm. The distances O need not all be the same, and can be based, for example, on a combination of aesthetic (e.g., minimizing visibility) and functional (e.g., sufficiently increasing roof strength) considerations. In certain embodiments utilizing brazing, the character line 36 runs at least along a length of each of the brazed joints B, for example having a length L that is substantially the same as a length of the brazed joint to accommodate the one or more pusher blocks that are typically utilized in roof brazing.

In certain embodiments of the present teachings, a brazed joint B (see FIG. 1), such as that formed by laser brazing, can be applied to secure the roof panel 30 to the body side panel 20. One skilled in the art will appreciate however, that other types of attachment processes may be employed instead of brazing.

While certain embodiments of the present teachings have been described in detail, those familiar with the art to which this invention relates will recognize various alternative designs and embodiments for practicing the invention as defined by the following claims. Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A method for attaching a vehicle roof panel to opposing vehicle body side panels, the method comprising:
    placing the vehicle roof on the opposing body side panels, the vehicle roof comprising a character line;
    applying a mounting force to the roof panel to create a direct line of contact between the roof panel and each of the body side panels, the character line absorbing vertical deformation of the vehicle roof in response to the mounting force; and
    attaching the roof panel to the body side panels by brazing or welding at the direct line of contact between the roof panel and each of the body side panels.

2. The method of claim 1, wherein applying a mounting force comprises pressing the roof panel to the body side panels using one or more pusher blocks.

3. A method of manufacturing a steel vehicle roof panel having a thickness of less than 0.63 mm and which is able to withstand mounting forces applied orthogonal to a plane in which the roof panel generally lies, the method comprising:
    stamping a vehicle roof panel such that a raised bead portion is formed at each side thereof,
    wherein stamping of the roof panel to create the raised bead portions creates a character line that strengthens the roof by absorbing at least a portion of the mounting forces.

4. The method of claim 3, wherein stamping the vehicle roof comprises stamping side mounting flanges that curl under the raised bead portion at an angle of greater than 90° with respect to the horizontal.

5. A vehicle roof panel for attachment to a body side panel by application of a mounting force and brazing, the roof panel comprising:
- a stamped steel sheet having a thickness of less than 0.63 mm;
- a raised bead portion at the outer edges thereof;
- a central portion; and
- a character line extending between the central portion and the raised bead portion.

6. The roof panel of claim 5, wherein the character line comprises a sloped surface extending from the raised bead portion of the roof panel to the central portion of the roof panel.

7. The roof panel of claim 6, wherein the sloped surface extends at an angle of about 30° to about 85° with respect to the horizontal.

8. The roof panel of claim 7, wherein the sloped surface extends at an angle of about 45° with respect to the horizontal.

9. The roof panel of claim 5, wherein the character line has a depth of about 3.0 mm to about 5.0 mm.

10. The roof panel of claim 9, wherein the roof panel is attached to the body side panels by a brazed joint, and wherein the character line is spaced from and parallel to the brazed joint.

11. The roof panel of claim 10, wherein the character line is spaced from the brazed joint by a distance of about 40 mm.

12. The roof panel of claim 10, wherein the character line has a length that is substantially the same as a length of the brazed joint.

13. The roof panel of claim 5, wherein the character line is spaced from a front of the roof panel and from a rear of the roof panel.

14. The roof panel of claim 13, wherein the character line is spaced from the front and the rear of the roof panel by a distance of about 25 mm.

15. The roof panel of claim 5, further comprising side mounting flanges that curl under the raised bead portions at an angle of greater than 90° with respect to the horizontal.

16. A vehicle body structure comprising:
- a body side panel comprising a roof mounting surface;
- a roof panel having opposing sides and comprising;
- a raised bead portion on each side of a central portion;
- character lines having sloped surfaces extending downward from each raised bead portion to the central portion; and
- a side mounting flange at each side of the roof panel that curls under the raised bead portions, each side mounting flange having a direct line of contact with a corresponding roof mounting surface; and
- a brazed joint attaching the roof panel to the body side panel along the direct line of contact.

17. The roof panel of claim 16, wherein the character line comprises a sloped surface extending from the raised bead portion of the roof panel to the central portion of the roof panel.

18. The roof panel of claim 17, wherein the sloped surface extends at an angle of about 30° to about 85° with respect to the horizontal.

19. The roof panel of claim 18, wherein the sloped surface extends at an angle of about 45° with respect to the horizontal.

20. The roof panel of claim 16, wherein the character lines are spaced from the brazed joints by a distance of about 40 mm.

* * * * *